E. F. HARRINGTON.
Cork-Cutting Machines.

No. 146,528.  Patented Jan. 20, 1874.

WITNESSES.
C. L. Marston
H. K. Porter

INVENTOR.
Edward F. Harrington
By T. W. Porter Atty.

UNITED STATES PATENT OFFICE.

EDWARD F. HARRINGTON, OF BOSTON, MASSACHUSETTS.

IMPROVEMENT IN CORK-CUTTING MACHINES.

Specification forming part of Letters Patent No. 146,528, dated January 20, 1874; application filed October 16, 1872.

*To all whom it may concern:*

Be it known that I, EDWARD F. HARRINGTON, of Boston, in the county of Suffolk and State of Massachusetts, have invented certain Improvements in Cork-Cutting Machines, of which the following is a specification:

The first part of my invention relates to the combination and arrangement of a horizontally and vertically adjustable rest with the cylindrical rotary cutter; also, in the combination and arrangement of the rotary cork-cutter, a sliding hollow arbor, and a non-sliding expelling-rod; also, in so dividing said rod that the portion in said arbor may rotate therewith; also, in the combination, with said hollow arbor, of a revolving bushing or sleeve, provided with one or more internal splines, fitting corresponding grooves in the arbor, so that the arbor shall revolve with the sleeve, yet have a free end play imparted thereto by a clutch and lever, which are also combined with the sliding arbor; also, in the combination, with the arbor, clutch, and lever, of an adjustable bearing for the support of the clutch and lever, whereby the arbor and its bearings are protected against shocks, pressure, and the wear resulting therefrom; also, in combining, with the horizontally-adjustable rest, means for a similar adjustment of both the clutch and expelling-rod relatively to the sliding arbor, by which to limit the movement of said arbor to the least requisite distance in all cases.

Figure 1:
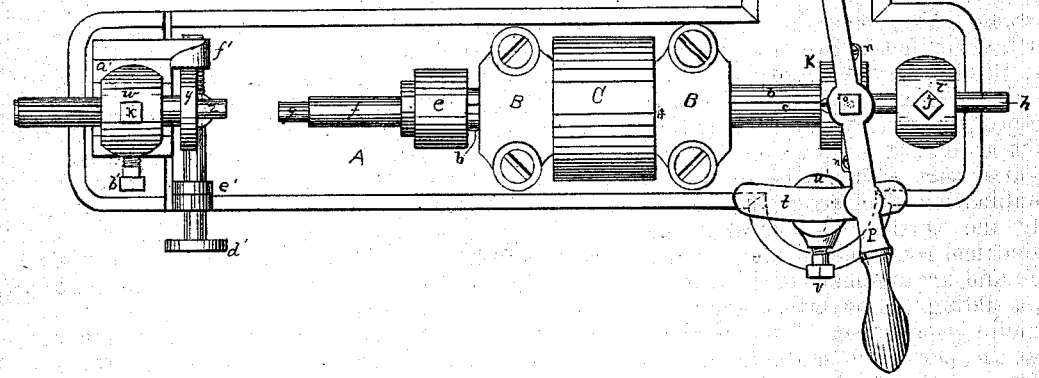
Figure 2:
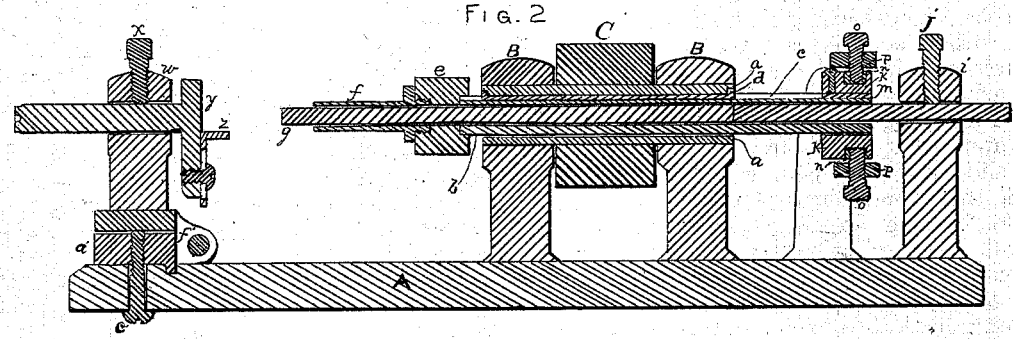
Figure 3:
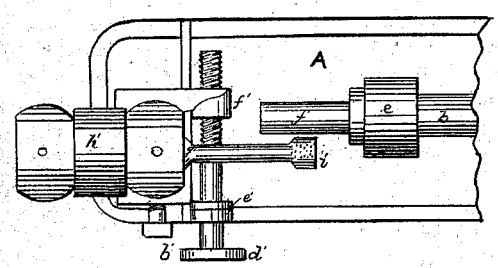

Figure 1 is a top or plan view of a machine embodying my invention as arranged for cutting corks. Fig. 2 is a horizontal vertical section of the same. Fig. 3 is a detached top or plan view, showing the arrangement and application of the grinder; and Fig. 4 is a longitudinal vertical section of the same.

A is the bed of the machine, and B B are the main bearings or boxes, in which freely revolves the cylindrical bushing or sleeve $a$, to which motion is imparted by a belt acting upon pulley C, which is either secured upon or formed as part of the bushing. $b$ is the hollow arbor, upon the front end of which is either formed or secured the head $e$, in which is inserted the cylindrical cutter $f$, as shown. One or more splineways, as shown at $c$, are cut throughout the length of the arbor, and in which the spline $d$ is fitted. This spline is secured rigidly within and to the sleeve $a$, so that the rotary motion of the latter is imparted to the arbor, yet allowing it free end play. $g$ is a section of the expelling-rod, inserted loosely within the arbor and cutter, while $h$ is another section, rigidly secured in standard $i$ by set-screw $j$. $k$ is a hub or collar, secured upon arbor $b$ by means of set-screw $l$, which bears upon a gib, $m$, inserted in splineway $c$, while $n$ is a clutch formed in halves and united by screws, as shown in Fig. 1. This clutch fits into a concentric groove formed in the hub, as shown in Fig. 2, while two set-screws, $o\ o$, passing through the sides of the looped lever $p$, and loosely entering corresponding holes in the two halves of the clutch, serve as the means of imparting a sliding motion to the arbor through the agency of the lever, yet allowing it a free rotary motion, while the clutch is thus held by the lever and pins $o$. The back end of lever $p$ is slotted and embraces the pin $q$, which is inserted in stud $r$ and held by set-screws $s$. This pin serves as the fulcrum of the lever, and as the center of the lever must move in a right line with the arbor, therefore the end is slotted to allow an end play thereof. $t$ is a rest, a stem of which is inserted in stud $u$, and secured by set-screw $v$, so as to allow a vertical adjustment of the rest to accommodate it to the lever, a foot or bearing of which slides upon the rest, thereby relieving the arbor not only of the weight of the lever and clutch, but from all shocks and strains which would otherwise be thereto imparted by the force exerted in operating the machine. $z$ is a rest for supporting the cork-wood when being cut. It is secured to face-plate $y$, and arranged to adjust vertically, as the varying thickness of cork and consequent sizes of cutters may require. The face-plate $y$ has a stem, which passes through standard $w$, as shown in Figs. 1 and 2, and is secured by set-screw $x$. By this means the face-plate and rest may be adjusted horizontally with reference to cutter $f$, as the same is worn away in length, or for other reasons. $a'$ is a sliding plate, arranged to move transversely to bed A, and having a tongue formed upon its under side to slide in a transverse groove in the bed, as shown in Fig. 2, thereby always holding the sliding plate at right angles with the bed. A screw, $c'$, passes up through a transverse slot in the bed, and is inserted in the plate, thereby securing it to the bed, yet allowing it a lateral movement, which is effected by actuating the screw $d'$, which fits into a threaded hole in ear $f'$, formed upon the plate, while a collar formed upon the screw, and which revolves in a recess in the middle of the divided bearing $e'$, (through which the screw passes,) serves as the means of preventing end motion of the screw, and thereby enables the screw, when rotated, to actuate the plate, as before described.

The standard $w$ is secured in a dovetailed slot formed in the upper side of plate $a$, and is locked therein by set-screw $b'$, so that by actuating this set-screw the standard may be released and readily removed from plate $a'$, when it is desired to substitute the grinding, which is constructed as follows: D is the frame, which is formed to be inserted in plate $a'$, and locked by the set-screw in the same manner as standard $w$. $g'$ is an arbor fitted to revolve in the two standards of frame D. $h'$ is a pulley secured upon arbor $g'$, whereby by a belt rotary motion is imparted to the arbor. $i'$ is a small emery-wheel attached to arbor $g'$. This arbor is so arranged that its axis is in the same horizontal plane as that of cutter $f$. These cutters are formed of steel and tempered, so as to offer the finest possible cutting-edge to the cork; and in the process of tempering they inevitably assume a form other than that of a true cylinder, as before tempering, and which is necessary to their performing their work in the best manner. After being tempered and inserted in head $e$, and the grinding apparatus is placed in position, as shown in Figs. 1 and 2, then both the cutter and the emery grinder are revolved at a high velocity in such directions as that the respective surfaces at the point of contact shall move in opposite directions, whereby the abrading action of the emery serves to reduce the cutter to a true cylinder.

Figure 4:
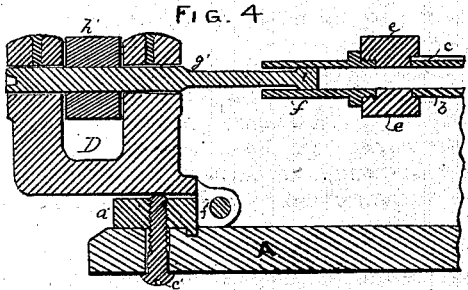

In Fig. 3 the grinder is shown as acting upon the exterior of the cutter, while in Fig. 4 it is acting upon the interior. By means of the lateral adjustment of the grinder, as before described, the desired force of contact between it and the cutter is obtained, while by means of the sliding movement of arbor $b$, the entire length of the cutter may be brought in contact with the grinder, so that a small emery grinder serves to reduce all the various sizes of cutters to a practically perfect form at the smallest expense; and of the necessity and delicacy of this operation, it need only be stated that the thickness of the shell of the larger cutters is but the sixty-fourth of an inch, while that of the smaller ones is but the one-hundredth of an inch.

The adjustment and operation of the machine for cutting corks are as follows: The operator actuates the lever P with his right hand, and manipulates the cork-wood to be cut with his left hand. When cutter $f$ is withdrawn, the head $e$ is brought in contact with the left-hand bearing B, these serving as a stop to the sliding movement of the arbor in that direction; hence the face-plate $y$ is so adjusted as to leave only the requisite space between it and the end of the cutter (when thus thrown back) for the ready insertion and manipulation of the strips of cork-wood; therefore the position of the face-plate is changed as various lengths of corks are being cut, and as the wearing away of the cutter may render necessary. The clutch-hub $k$ is, by means of set-screw $l$, so adjusted upon the arbor as to be brought in contact with the right-hand bearing B, and serve as a stop just as the end of the cutter is through the cork, and in contact with the face-plate, which latter is faced or bushed with soft metal for that purpose. The section $h$ of the expelling-rod is so adjusted as that the end of section $g$ shall slightly protrude from the end of the cutter when the latter is thrown back, thereby insuring the expulsion of the cork therefrom. By means of this trifling adjustment, the operator is saved all superfluous movement of the arbor, and may limit it by positive stops, as the thickness of the cork being cut will allow, while, by reason of the divided rod, a large part of the friction between it and the arbor, when not thus divided, is avoided, as the section $g$ revolves freely therewith.

I claim as my invention—

1. The combination and arrangement of the rigid section $h$ and the rotary section $g$ of the expelling-rod with the hollow sliding arbor $b$ and cutter $f$, substantially as and for the purposes specified.

2. The combination and arrangement of the internally-splined revolving sleeve $a$, the hollow sliding arbor $b$, and the non-sliding expelling-rod, substantially as and for the purposes specified.

3. In combination with arbor $b$, clutch $n$, and lever $p$, the rest $t$, substantially as described and shown.

4. The combination of the horizontally adjustable face-plate $y$, the adjustable clutch $n$, arbor $b$, and the adjustable expelling-rod, substantially as and for the purposes specified.

EDW. F. HARRINGTON.

Witnesses:
  H. K. PORTER,
  CHAS. B. F. ADAMS.